(12) United States Patent
Teramoto et al.

(10) Patent No.: US 8,370,903 B2
(45) Date of Patent: Feb. 5, 2013

(54) IMAGE FORMING APPARATUS UNIFYING MANAGEMENT FOR USE OF IMAGE FORMING APPARATUS AND USE OF WEB SERVICE

(75) Inventors: Keisuke Teramoto, Itami (JP); Ayumi Itoh, Ikoma-gun (JP); Hisashi Uchida, Kuze-gun (JP); Hidetaka Iwai, Itami (JP); Yoichi Kawabuchi, Itami (JP); Yoshikazu Ikenoue, Itami (JP)

(73) Assignee: Konica Minolta Business Technologies, Inc, Tokyo (JP)

( * ) Notice: Subject to any disclaimer, the term of this patent is extended or adjusted under 35 U.S.C. 154(b) by 1024 days.

(21) Appl. No.: 12/045,453

(22) Filed: Mar. 10, 2008

(65) Prior Publication Data

US 2008/0282333 A1  Nov. 13, 2008

(30) Foreign Application Priority Data

May 10, 2007  (JP) .................................. 2007-125769

(51) Int. Cl.
*G06F 19/00* (2011.01)
(52) U.S. Cl. .................... 726/4; 726/8; 726/18; 726/28; 713/183
(58) Field of Classification Search .................. 726/4, 8, 726/18, 28; 713/183; 705/26
See application file for complete search history.

(56) References Cited

U.S. PATENT DOCUMENTS

2002/0052796 A1    5/2002  Tadokoro et al.

FOREIGN PATENT DOCUMENTS

| | | |
|---|---|---|
| JP | 2000-172646 | 6/2000 |
| JP | 2002-132714 | 5/2002 |
| JP | 2003-132030 | 5/2003 |
| JP | 2004-147090 | 5/2004 |
| JP | 2005-157431 | 6/2005 |
| JP | 2005-157828 | 6/2005 |
| JP | 2006-221571 | 8/2006 |
| JP | 2006-268353 | 10/2006 |

OTHER PUBLICATIONS

Japanese Office Action mailed on Apr. 14, 2009 directed towards counterpart foreign application No. 2007-125769; 10 pages.

*Primary Examiner* — Eleni Shiferaw
*Assistant Examiner* — Paul Callahan
(74) *Attorney, Agent, or Firm* — Morrison & Foerster LLP (57) ABSTRACT

An MFP stores information of a web service for permitting use with respect to each user, and information for limiting a use of its function. When there is a web service allowed to be used by the logged in user, its list is displayed. When a linked function with the selected web service is not allowed to be used, a massage to the effect that is displayed and when the use of the function is limited, limited contents are displayed to confirm the use of the web service.

8 Claims, 12 Drawing Sheets

| | | | |
|---|---|---|---|
| USER A | MFP LOGIN INFORMATION | ID | XXXXA |
| | | PASSWORD | YYYYA |
| | MFP LIMIT INFORMATION | COPY | OK |
| | | PRINT | OK |
| | | SCAN | OK |
| | | FAX | OK |
| | WEB SERVICE LIMIT INFORMATION | MUSIC SCORE DOWNLOAD SERVICE | OK |
| | | WEB SERVER BOX | OK |
| USER B | MFP LOGIN INFORMATION | ID | XXXXB |
| | | PASSWORD | YYYYB |
| | MFP LIMIT INFORMATION | COPY | OK |
| | | PRINT | OK |
| | | SCAN | NG |
| | | FAX | NG |
| | WEB SERVICE LIMIT INFORMATION | MUSIC SCORE DOWNLOAD SERVICE | OK |
| | | WEB SERVER BOX | NG |
| USER C | MFP LOGIN INFORMATION | ID | XXXXC |
| | | PASSWORD | YYYYC |
| | MFP LIMIT INFORMATION | COPY | OK |
| | | PRINT | NG |
| | | SCAN | NG |
| | | FAX | NG |
| | WEB SERVICE LIMIT INFORMATION | MUSIC SCORE DOWNLOAD SERVICE | NG |
| | | WEB SERVER BOX | NG |

FIG.5

| | ID | AAAAA |
| --- | --- | --- |
| MUSIC SCORE DOWNLOAD SERVICE | PASSWORD | YYYYA |
| | LINKED FUNCTION | PRINT |
| WEB SERVER BOX | ID | BBBBB |
| | PASSWORD | YYYYY |
| | LINKED FUNCTION | PRINT |
| | | SCAN |

LOGIN SCREEN

| USER ID | |
| PASSWORD | |

LOGIN

FIG.8

INITIAL SCREEN

PLEASE SELECT FUNCTION TO USE

| COPY | FAX |
| PRINT | WEB SERVICE |
| SCAN | |

| USER A | MFP LOGIN INFORMATION | ID | XXXXA |
|---|---|---|---|
| | | PASSWORD | YYYYA |
| | MFP LIMIT INFORMATION | COPY | UP TO 100 |
| | | PRINT | 0 |
| | | SCAN | UP TO 10 |
| | | FAX | OK |
| | MFP USAGE INFORMATION | COPY | 100 |
| | | PRINT | 0 |
| | | SCAN | 2 |
| | WEB SERVICE LIMIT INFORMATION | MUSIC SCORE DOWNLOAD SERVICE | OK |
| | | WEB SERVER BOX | OK |
| ⋮ | ⋮ | ⋮ | ⋮ |

| | | | |
|---|---|---|---|
| USER A | MFP LOGIN INFORMATION | ID | XXXXA |
| | | PASSWORD | YYYYA |
| | | BELONGING GROUP | SECOND GROUP |
| | MFP LIMIT INFORMATION | COPY | OK |
| | | PRINT | OK |
| | | SCAN | OK |
| | | FAX | OK |
| | WEB SERVICE LIMIT INFORMATION | MUSIC SCORE DOWNLOAD SERVICE | OK |
| | | WEB SERVER BOX | OK |
| USER B | MFP LOGIN INFORMATION | ID | XXXXB |
| | | PASSWORD | YYYYB |
| | | BELONGING GROUP | FIRST GROUP |
| | MFP LIMIT INFORMATION | COPY | OK |
| | | PRINT | OK |
| | | SCAN | NG |
| | | FAX | NG |
| | WEB SERVICE LIMIT INFORMATION | MUSIC SCORE DOWNLOAD SERVICE | OK |
| | | WEB SERVER BOX | NG |
| USER C | MFP LOGIN INFORMATION | ID | XXXXC |
| | | PASSWORD | YYYYC |
| | | BELONGING GROUP | THIRD GROUP |
| | MFP LIMIT INFORMATION | COPY | OK |
| | | PRINT | NG |
| | | SCAN | NG |
| | | FAX | NG |
| | WEB SERVICE LIMIT INFORMATION | MUSIC SCORE DOWNLOAD SERVICE | NG |
| | | WEB SERVER BOX | NG |
| ⋮ | ⋮ | ⋮ | ⋮ |

FIG.14

| MUSIC SCORE DOWNLOAD SERVICE | FIRST GROUP | ID | AAAA1 |
| --- | --- | --- | --- |
| | | PASSWORD | YYYY1 |
| | SECOND GROUP | ID | AAAA2 |
| | | PASSWORD | YYYY2 |
| | THIRD GROUP | ID | AAAA3 |
| | | PASSWORD | YYYY3 |
| WEB SERVER BOX | | ID | BBBBB |
| | | PASSWORD | YYYYY |

FIG.15

| USER A | MFP LOGIN INFORMATION | ID | XXXXA | |
| --- | --- | --- | --- | --- |
| | | PASSWORD | YYYYA | |
| | MFP LIMIT INFORMATION | COPY | OK | |
| | | PRINT | OK | |
| | | SCAN | OK | |
| | | FAX | OK | |
| | WEB SERVICE LIMIT INFORMATION | MUSIC SCORE DOWNLOAD SERVICE | BROWSING | OK |
| | | | PRINT | OK |
| | | WEB SERVER BOX | BROWSING | OK |
| | | | PRINT | OK |
| | | | SCAN | NG |

FIG.16

IMAGE FORMING APPARATUS UNIFYING MANAGEMENT FOR USE OF IMAGE FORMING APPARATUS AND USE OF WEB SERVICE

This application is based on Japanese Patent Application No. 2007-125769 filed with the Japan Patent Office on May 10, 2007, the entire content of which is hereby incorporated by reference.

BACKGROUND OF THE INVENTION

1. Field of the Invention

The present invention relates to an image forming apparatus, an information management device, a computer readable medium storing an information management program, and a method for using a web service and more particularly, to an image forming apparatus using the web service, an information management device managing information about the image forming apparatus using the web service, a computer readable medium storing an information management program for managing the information about the image forming apparatus using the web service, and a method for using a web service using the image forming apparatus.

2. Description of the Related Art

An image forming apparatus such as an MFP (Multi Function Peripheral), a printer, and a copying machine has increasingly become highly functional. Therefore, by mounting a browser for browsing a web site on the image forming apparatus, the web service can be used with the image forming apparatus. In addition, the web service linked to a copying function and a scanning function mounted on the image forming apparatus becomes available.

This kind of image forming apparatus is set in an office and the like in many cases. In this case, a plurality of users can use the web service with the image forming apparatus. Thus, a management system in using the image forming apparatus and the web service by the user becomes complicated in some cases.

In view of the above problem, Japanese Laid-Open Patent Publication No. 2005-157828 discloses a technique for managing the number of usage times of a client on a server side by determining the number of usable times by a server providing the web service and providing it buried in data to be provided, to the client.

In addition, Japanese Laid-Open Patent Publication No. 2006-221571 discloses a technique for managing data on the provider side by setting print condition information in print data provided from the server and setting the availability of image formation and the number of permission and the like in that print condition information at each area in which a printer is set.

By the way, when the image forming apparatus is used by a plurality of users in an office and the like, it is necessary to register the users in the image forming apparatus in some cases. Furthermore, when the user uses the web service, it is necessary to apply for registration (contract) to the provider of the web service with respect to each user in some cases.

Thus, in addition to the registration to the image forming apparatus, when it is necessary to apply for the registration to the provider of each web service, the registration operation becomes complicated. This could prevent the web service from being spread. As a result, the problem is that operational efficiency could be lowered.

In addition, when the web service is used with the image forming apparatus, it is necessary to perform an authentication operation to the provider of the service in addition to an authentication operation to the image forming apparatus. Thus, the problem is that the authentication operation becomes complicated and operability is lowered.

The above problem caused by a complication of a management system is generated not only in the user usage but also in charging management in the office. The more the web service is used, the more the charging management becomes complicated.

Furthermore, the usage is limited to each user as the management in the image forming apparatus in some cases. When the web service linked to a limited function is used, there is a problem that it is found that the web service linked to the limited function cannot be used because the function is limited until the function is to be used after the authentication operation has been performed in the image forming apparatus and the authentication operation has been performed for the provider of the service. That is, the problem is that the operability is not good for the user because the management of a use of the image forming apparatus and a use of the web service is not unified.

SUMMARY OF THE INVENTION

The present invention was made in view of the above problems and it is an object of the present invention to provide an image forming apparatus, an information management device, a computer readable medium storing an information management program, and a method for using a web service capable of simplifying managements and improving the operability of a user by unifying the management of a use of the image forming apparatus and a use of the web service.

In order to attain the above object, according to a certain aspect of the present invention, an image forming apparatus includes a first acquiring unit acquiring first authentication information related to each user, to use the image forming apparatus, a second acquiring unit acquiring an authenticated result of the user based on the first authentication information from an authenticating unit, a third acquiring unit acquiring second authentication information related to the image forming apparatus, to use a web service with the image forming apparatus, from a memory unit, and an accessing unit accessing the web service with the second authentication information when the authenticated result establishes the authentication of the user.

Preferably, the image forming apparatus further includes a fourth acquiring unit acquiring function limit information for limiting a use of the function of the image forming apparatus with respect to the user from the memory unit and a fifth acquiring unit acquiring information about a linked function of the image forming apparatus with the web service from the memory unit, and the accessing unit accesses the web service when the user can use the linked function of the image forming apparatus with the web service.

More preferably, the image forming apparatus further includes a designating unit designating a use of the web service, and the accessing unit accesses the web service when the designating unit designates the use of the web service in a case where the use of the linked function of the image forming apparatus with the web service is limited for the user.

Preferably, the image forming apparatus further includes a sixth acquiring unit acquiring service use limit information for limiting the use of the web service from the memory unit, and the accessing unit accesses the web service when the use of the web service is allowed for the user.

More preferably, the service use limit information limits the use of the web service with respect to the user. In addition, more preferably, the service use limit information limits the use of the linked function of the image forming apparatus with the web service with respect to the user.

Preferably, the first authentication information includes information for specifying a group the user belongs to and the second authentication information is related to the group.

According to another aspect of the present invention, an information management device includes a first memory unit storing authentication information related to an image forming apparatus, to use a web service with the image forming apparatus, a second memory unit storing information for limiting the use of the function of the image forming apparatus for each user, a third memory unit storing information about the linked function of the image forming apparatus with the web service, and an accessing unit accessing the web service when the user can use the linked function of the image forming apparatus with the web service.

According to still another aspect of the present invention, a computer readable medium storing an information management program allows a computer to function as an image forming apparatus, and the program allows the computer to perform the steps of receiving the input of first authentication information related to a user, to use the image forming apparatus, acquiring an authenticated result of the user based on the first authentication information from an authenticating function, acquiring second authentication information related to the image forming apparatus, to use a web service with the image forming apparatus, from the memory unit, and accessing the web service with the second authentication information when the authenticated result establishes the authentication of the user.

According to still another aspect of the present invention, a method for using a web service includes the steps of receiving the input of first authentication information related to a user, to use the image forming apparatus, acquiring an authenticated result of the user based on the first authentication information from an authenticating function, acquiring second authentication information related to the image forming apparatus, to use a web service with the image forming apparatus, from the memory unit, and accessing the web service with the second authentication information when the authenticated result establishes the authentication of the user.

According to the image forming apparatus and the information management device in the present invention, when the web service is used using the image forming apparatus, the management for the use of the image forming apparatus and the use of the web service can be unified. Therefore, the above management can be easy. In addition, the operability of the user can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described with reference to the drawings hereinafter. In addition, the same symbols are allotted to the same part or component in the following description. Their names and functions are the same.

According to this embodiment, an image forming apparatus according to the present invention corresponds to a copying machine, a printer, or a multifunctional peripheral (MFP) of those. In this embodiment, it is assumed that the image forming apparatus is an MFP and FIG. 1 shows one specific example of the constitution of a printing system in which the MFP accesses servers providing web services through the Internet and prints data received from the server.

Figure 1:
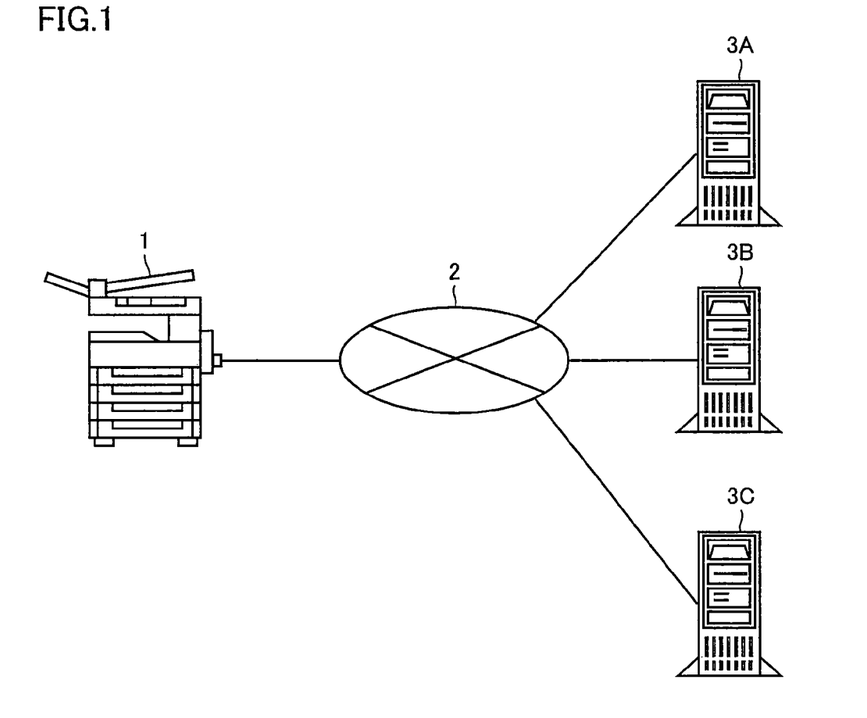
FIG. 1 shows a specific example of the constitution of a printing system.

With reference to FIG. 1, the printing system according to this embodiment includes an MFP 1 connected through Internet 2, and web servers 3A, 3B and 3C (represented by a web server 3).

The specific example of the web services provided by web servers 3A, 3B, and 3C includes a music score download service providing music score information using a browser in the MFP and a web server box providing a memory area on the web server to store image data scanned by the MFP, for example.

Figure 2:
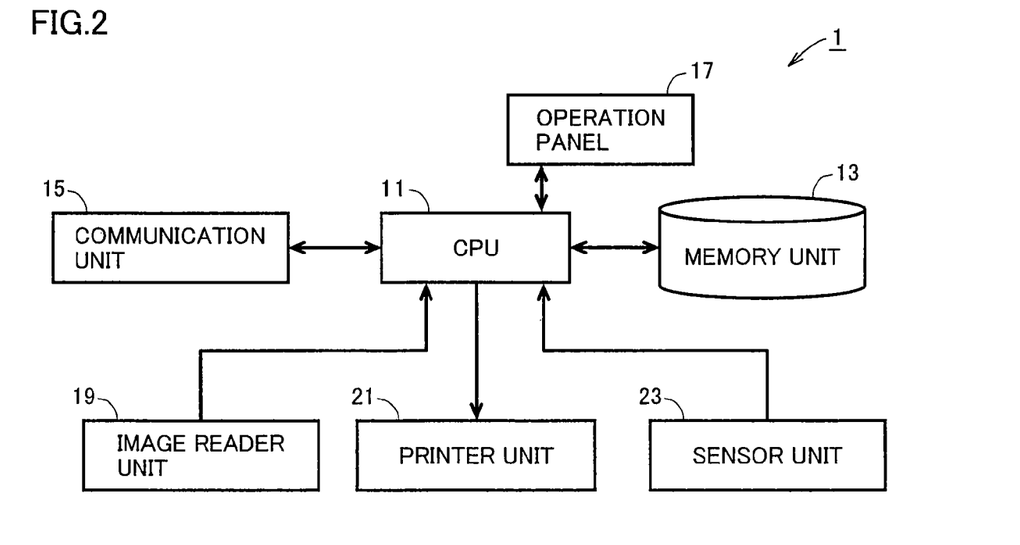
FIG. 2 is a block diagram showing a specific example of a hardware constitution of an MFP (Multi Function Peripheral).

With reference to FIG. 2, MFP 1 includes a CPU (Central Processing Unit) 11 for controlling the whole apparatus, an image reader unit 19 for reading image data from an original, a printer unit 21 for printing an image on a sheet, a communication unit 15 for connecting MFP 1 to Internet 2 and performing wireless communication at a short distance, a memory unit 13 structured by an HD (Hard Disk) and an RAM (Random Access Memory), for storing a job and a program such as a line width control program executed by CPU 11, an operation panel 17 serving as an interface with a user, and a sensor unit 23 for detecting the remaining amount of a consumable supply.

Figure 3:
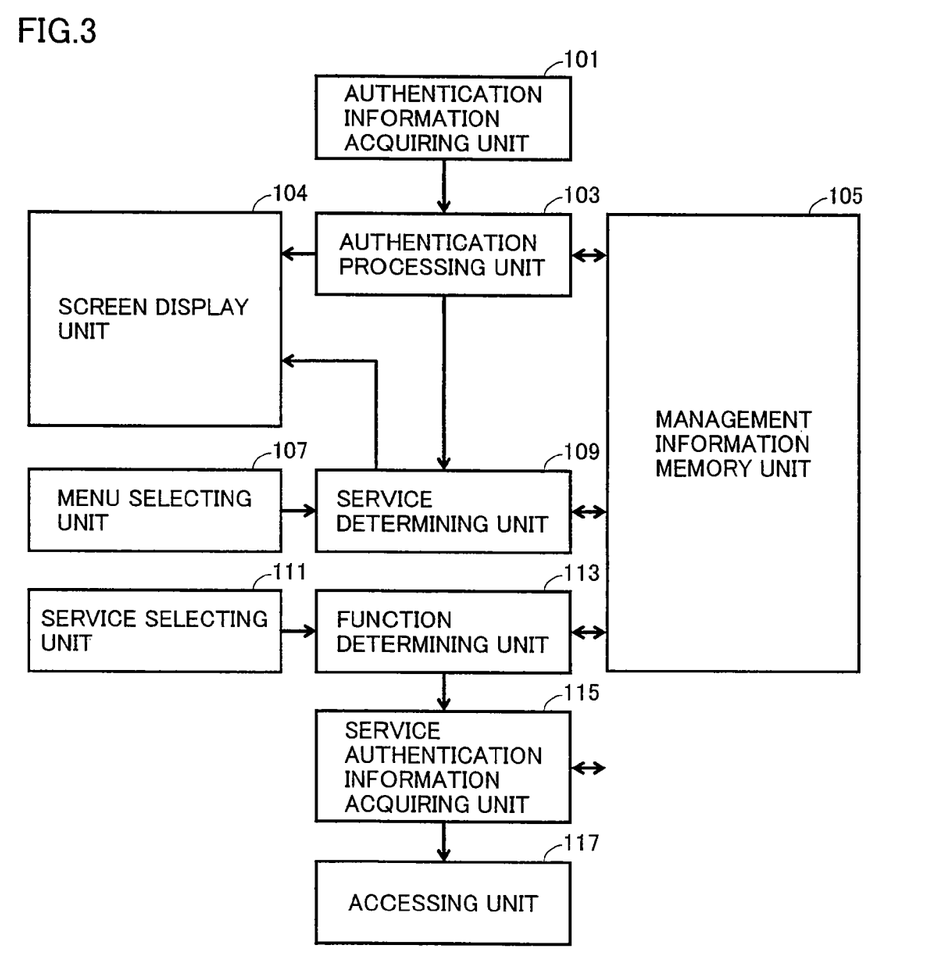
FIG. 3 is a block diagram showing a specific example of a function constitution of the MFP.

FIG. 3 is a block diagram showing a specific example of a function constitution of MFP 1 to use the web service provided from web server 3 using MFP 1 in the printing system. Although functions shown in FIG. 3 are implemented by executing the program stored in memory unit 13 by CPU 11, they may be partially provided in hardware.

With reference to FIG. 3, the above functions of MFP 1 include an authentication information acquiring unit 101, an authentication processing unit 103, a screen display unit 104, a management information memory unit 105, a menu selecting unit 107, a service determining unit 109, a service selecting unit 111, a function determining unit 113, a service authentication information acquiring unit 115, and an accessing unit 117.

Authentication information acquiring unit 101 acquires authentication information as user information for logging in MFP 1 from an operation signal based on a login operation of the user by displaying a login screen on operation panel 17 and the like. The acquired authentication information is inputted to authentication processing unit 103.

Figure 4:
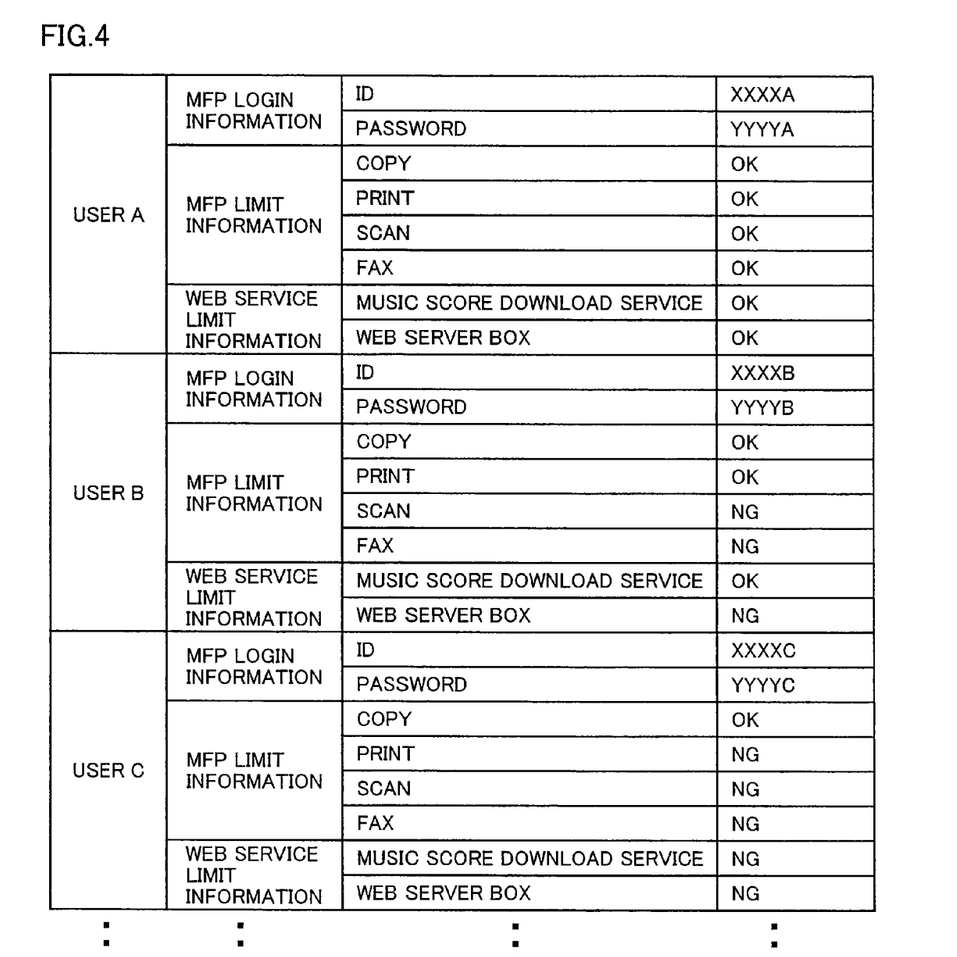
FIG. 4 shows a specific example of user management information.
Figure 5:
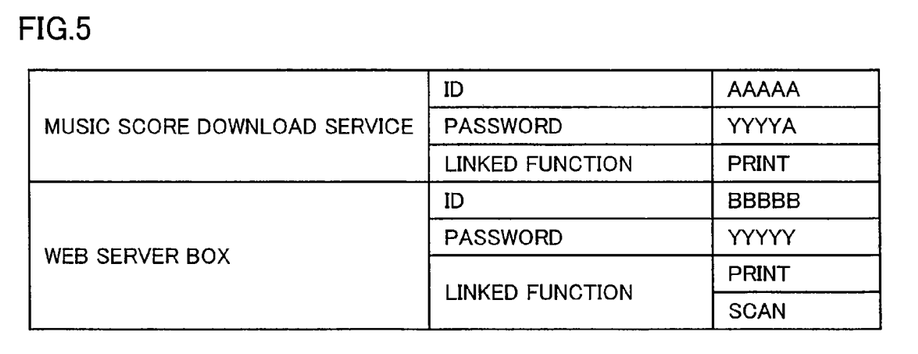
FIG. 5 shows a specific example of service management information.

A management information memory unit 105 is provided in a predetermined area of memory unit 13 or in a storing area in CPU 11 and stores management information regarding the user (referred to as user management information hereinafter) as shown in FIG. 4 and management information regarding the web service (referred to as service management information) as shown in FIG. 5.

More specifically, with reference to FIG. 4, the user management information includes authentication information for using MFP 1 (login information, referred to as the MFP login information hereinafter) and information for limiting a use of MFP 1 by the user and information for limiting the use of the web service that can be used with MFP 1 by the user with respect to each user registered in MFP 1. More specifically, the specific example of the MFP login information is an ID and password to specify the user. It is assumed that such information is registered in the user management information for each user. In addition, it is assumed that the functions mounted on MFP 1 include a copying function, a printing function, a scanning function and facsimile function. It is registered whether each user can use each function or not in the user management information as the information for limiting the use of MFP 1. In addition, it is assumed that the above-described music score download service and the web server box are provided as the web services that can be used with MFP 1. It is registered whether each service can be used or not with respect to each user in the user management information as the information for limiting the use of the web service.

Furthermore specifically, with reference to FIG. 5, the service management information includes an ID and a password as the authentication information by which MFP 1 logins the web service (referred to as service login information hereinafter) and information showing the linked function of MFP 1 as the information for limiting the use of the web service with respect to each web service registered in MFP 1. Furthermore, the service management information may include information regarding availability of a linked function of MFP 1 and regarding the limit of usage (upper limit of the number of outputs as will be described below) as information for limiting the use of the web service with respect to each web service. In addition, the "linked function of the MFP with the web service" means a function of the MFP used when the service provided in the web service with the MFP is used. For example, when the web service is the music score download service, the printing function of the MFP for printing the music score data corresponds to the linked function of the MFP with the web service. In addition, when the web service is the web server box, the "linked function of the MFP with the web service" corresponds to a scanning function of the MFP for scanning a manuscript image to obtain image data to be stored in the memory area on the web, and a printing function of the MFP for printing the image data stored in the memory area on the web.

It is needless to say that each of the user management information shown in FIG. 4 and the service management information shown in FIG. 5 is only one example. It is assumed that the above management information can be registered or changed by a specific user such as a manager of the printing system. More specifically, the "linked function of the MFP with the web service" is registered and/or changed when the specific user registers the web service in MFP 1, for example. The registering operations correspond to operations such as inputting access information to web server 3 providing the web service, to MFP 1, obtaining information for logging in the web service (service login information) through a contact with a provider (provider company) of the web service, and registering the user allowed to use the web service.

With reference to FIG. 3 again, authentication processing unit 103 carries out an authenticating process using an inputted authentication information, referring to the MFP login information in the user management information stored in management information memory unit 105. A signal showing the authenticated result is inputted to screen display unit 104 and service determining unit 109. The authenticating process by authentication processing unit 103 is not limited to a specific processing method in the present invention and a processing method used in general can be employed.

Screen display unit 104 displays a screen according to the authenticated result by authentication processing unit 103. More specifically, when the authentication is established in authentication processing unit 103, that is, when it is determined that the MFP login information corresponds to the registered user, screen display unit 104 outputs a control signal for displaying an initial screen to operation panel 17. Alternatively, when the authentication is not established in authentication processing unit 103, that is, when it is not determined that the MFP login information correspond to the registered user, a control signal for displaying a screen to show a failure in authentication is outputted to operation panel 17.

Menu selecting unit 107 receives a selection of a menu to be carried out from an operation signal based on the operation of the user performed according to the initial screen displayed on operation panel 17. When a selected menu is for using the web service, a signal showing a received selection result is inputted to service determining unit 109. Service determining unit 109 determines the web service allowed for the authenticated user, based on the signal referring to the information for limiting the use of the web service in the user management information stored in management information memory unit 105 and outputs a signal showing the determined result to screen display unit 104.

Screen display unit 104 displays a screen according to the determined result in service determining unit 109. More specifically, screen display unit 104 outputs a control signal to operation panel 17 for displaying a screen showing the allowed web service, which has been determined by service determining unit 109, as a selectable item and receiving its selection. Alternatively, a control signal for displaying a screen showing that there is no available web service, that is, the web service is not allowed to be used is outputted to operation panel 17. Service selecting unit 111 receives a selection of the web service to be used from an operation signal based on the operation of the user performed according to a selecting screen on operation panel 17. A signal showing the received web service is inputted to function determining unit 113.

Function determining unit 113 specifies the linked function of MFP 1 with the selected web service based on the signal with reference to the information showing the linked function of MFP 1 in the service management information stored in management information memory unit 105, and determines whether the specified function is allowed for the user or not with reference to the information for limiting the use of the MFP in the user management information. A signal showing the determined result is inputted to service authentication information acquiring unit 115.

Service authentication information acquiring unit 115 acquires the service login information from the service management information stored in management information memory unit 105 and outputs it to accessing unit 117. Accessing unit 117 accesses web server 3 providing a selected service through Internet 2 and generates a control signal for logging in using the inputted service login information and outputs it to communication unit 15.

Figure 6:
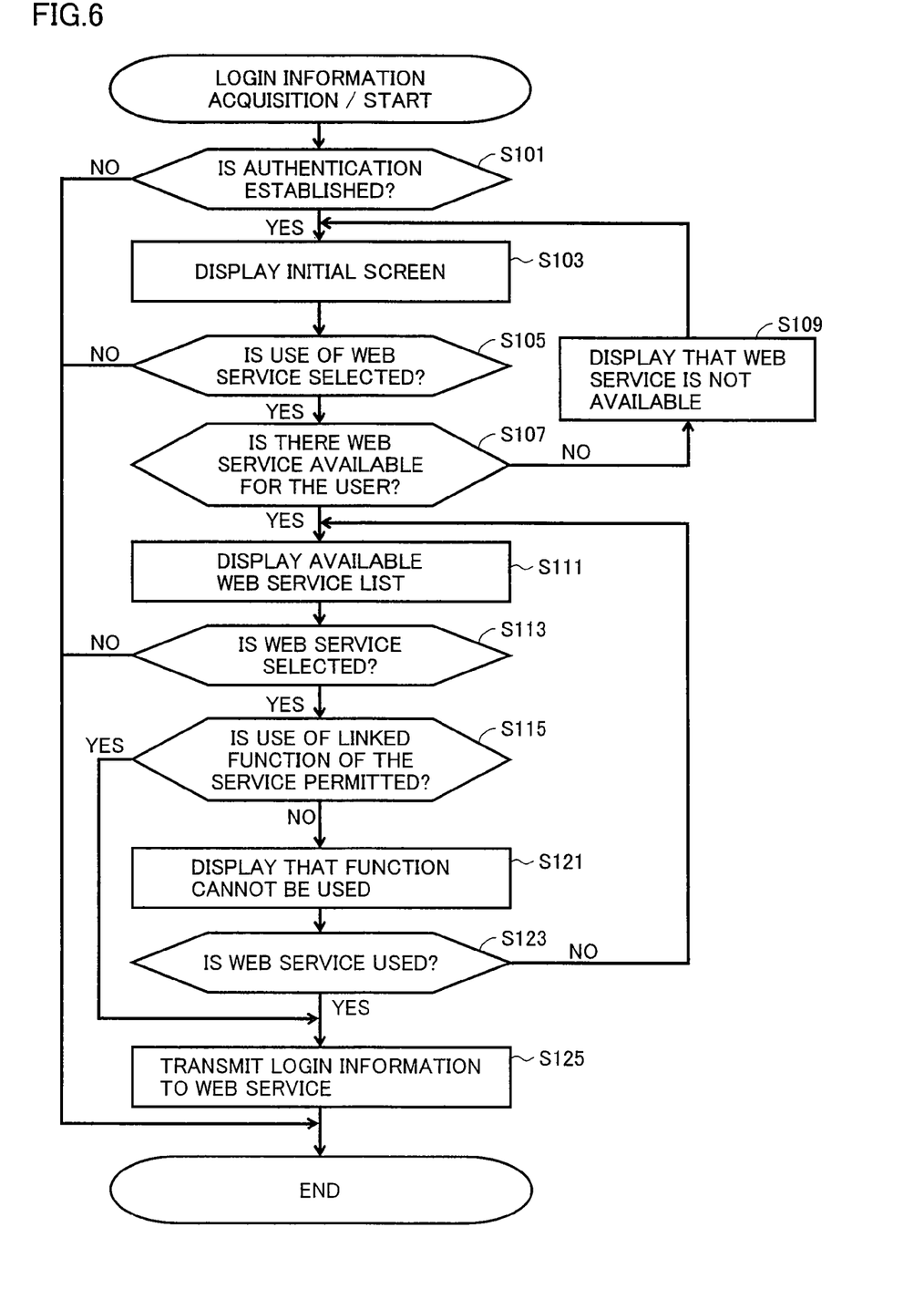
FIG. 6 is a flowchart showing a specific example of the processing flow carried out in the MFP.
Figure 7:
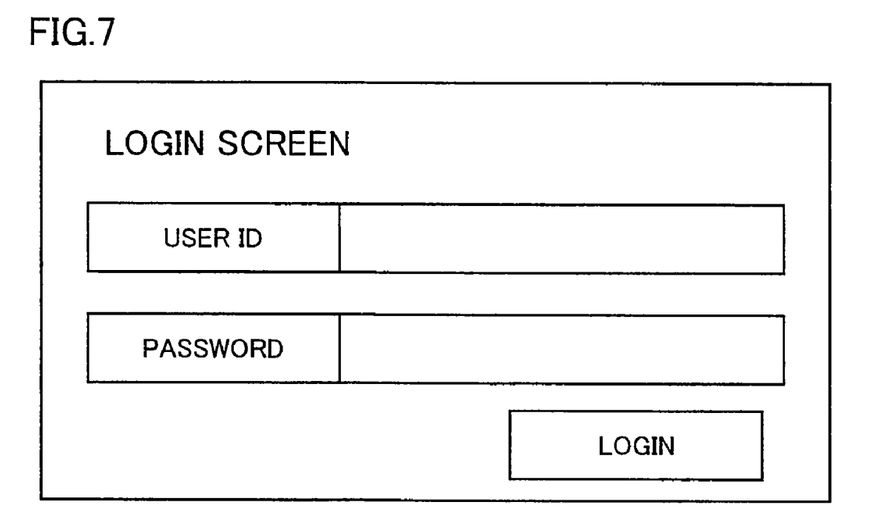
FIGS. 7, 8, 9, and 10 show specific examples of display screens.

FIG. 6 is a flowchart showing a specific example of a processing flow carried out in MFP 1 when the web service provided from web server 3 is used with MFP 1 in the printing system. The processes shown in the flowchart in FIG. 6 are started when the MFP login information is acquired by authentication information acquiring unit 101 and implemented by reading and executing a program stored in memory unit 13 by CPU 11 to realize each function shown in FIG. 3. Here, a login screen shown in FIG. 7 is specifically displayed on operation panel 17 and the processes shown in FIG. 6 are started when a user ID and the password are inputted to the screen and a login button is pressed.

With reference to FIG. 6, when the user authentication is established in authentication processing unit 103 (YES in step S101), the initial screen is displayed on operation panel 17 according to the control signal from screen display unit 104 (in step S103). When the authentication is not established, the screen for notifying the fact to an effect that is displayed or a warning message is outputted and the processes are completed without carrying out the following processes.

Figure 8:
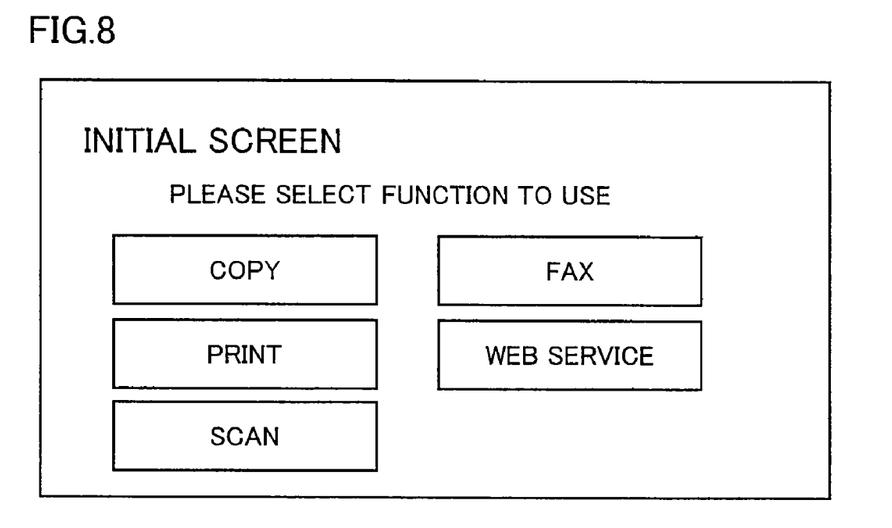

FIG. 8 is a view showing a specific example of the initial screen. In step S103, the functions (copying, printing, scanning, and faxing) mounted on MFP 1 and the available web service is selectively displayed in the initial screen as the functions available in MFP 1 for the registered user.

Figure 9:
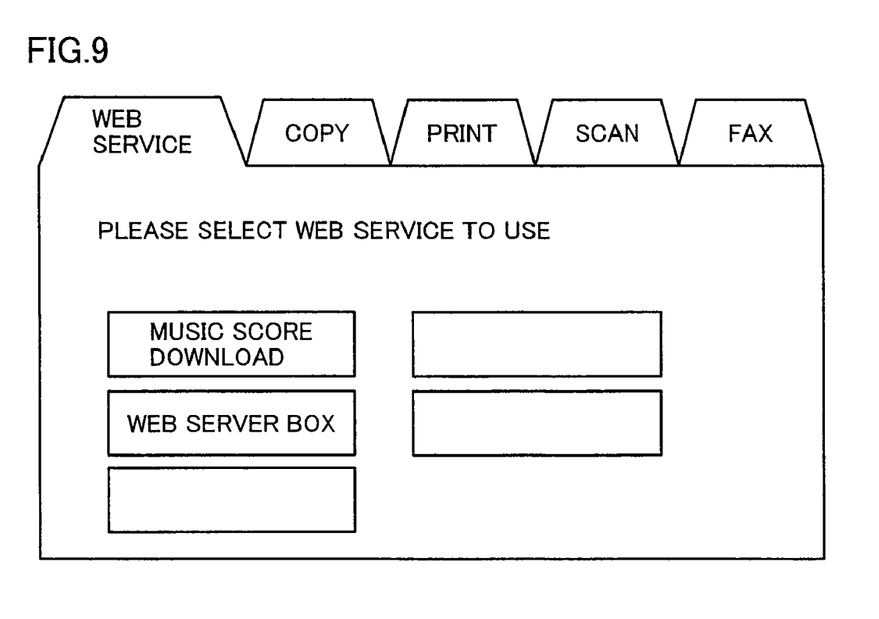

When the use of the web service is selected by menu selecting unit 107 in the initial screen (YES in step S105), it is determined by service determining unit 109 whether there is an available web service allowed for the user authenticated in step 101 or not, referring to the user management information as shown in FIG. 4 (in step S107). When there is an available web service (YES in step S107), a screen showing the list of the available web service is displayed on operation panel 17 according to the control signal from screen display unit 104 (in step S111). For example, when the user authenticated in step S101 is a user A in the specific example shown in FIG. 4, it is determined that the music score download service and the web server box are the available web services in step S107. In this case, a screen shown in FIG. 9 is displayed in step S111 and the web service to be used is selected from the music download service and the web server box. When there is not an available web service (NO in step S107), a display showing that the web service is not available is displayed on operation panel 17 based on the control signal from screen display unit 104 (in step S109) and then the process returns to step S103 and the initial screen is displayed thereon.

When the web service to be used is selected by service selecting unit 111 in the screen displayed in step S111 (YES in step S113), function determining unit 113 specifies a linked function of MFP 1 with the web service selected in step S113 with reference to the service management information as shown in FIG. 5. Furthermore, it is determined whether the function can be used by the user authenticated in step S101 or not with reference to the user management information (in step S115). When it is determined that the function can be used (YES in step S115), service authentication information acquiring unit 115 acquires the information for accessing server 3 providing that web service and the service login information from the service management information stored in management information memory unit 105. Thus, accessing unit 117 generates the control signal for logging into the web service via communication unit 15 based on the above information, so that communication unit 15 carries out the login (in step S125).

Figure 10:
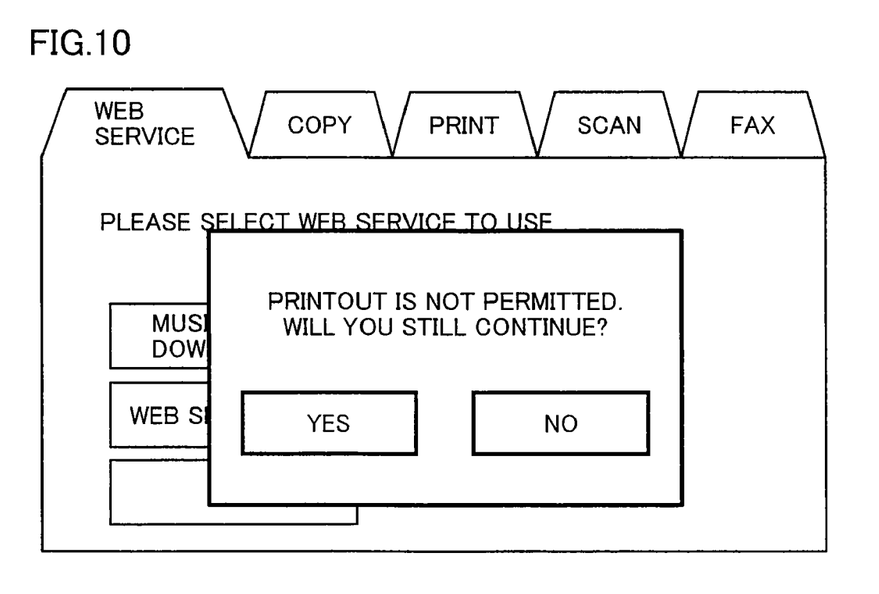

Meanwhile, when it is determined that the linked function of MFP 1 with the web service selected in step S113 is not allowed for the user authenticated in step S101 (NO in step S115), a screen to the effect that is displayed on operation panel 17 according to the control signal from screen display unit 104 (in step S121). For example, when the printing function is not allowed in the linked functions of the MFP with the web service selected in step S13, a screen to the effect that the printing cannot be performed as shown in FIG. 10 is displayed in step S121. In addition, in the case where the web service is used, even when the linked function cannot be allowed, the web service may be used using another allowed function in some cases. Alternatively, it may be used without using the linked function. More specifically, in the case where the music score download service is used as the web service, even when a use of the printing function is not allowed as the linked function, only browsing is enough in some cases. In addition, in the case where the web server box is used as the web service, even when the printing function is not allowed to be used as the linked function, the image data provided by scanning the manuscript may be stored or the stored data may be viewed in some cases. In view of the above usage, it is preferable that a screen to the effect that the use of the linked function of MFP 1 with the web service selected in step S113 is not allowed and showing an option whether the web service is still used or not in such state ("Will you still continue?" in FIG. 10) is displayed as shown in FIG. 10 in step S121. When service authentication information acquiring unit 115 receives a command signal showing that the web service is still used while the linked function is not allowed to be used (YES in step S123), service authentication information acquiring unit 115 acquires the information to access server 3 providing the web service and the service login information from the service management information stored in management information memory unit 105. Then, accessing unit 117 generates the control signal by which communication unit 15 logins the web service based on the above information and communication unit 15 carries out the login (in step S125).

When a command signal showing that the web service is not used as the linked function is not allowed to be used is received (NO in step S123), the process returns to step S111 and the screen showing a list of the available web service is displayed on operation panel 17.

When the user management information and the service management information are set as described above in MFP 1 according to this embodiment and the above processes are executed with the above management information, MFP 1 of the user can manage the use of the web service based on the management information. That is, MFP 1 can unify the management of the use of the MFP and the use of the web service.

In addition, when the user uses the web service with MFP 1, the user only have to operate MFP 1 to log in the service without an operation for logging in the web service. Thus, its operability is improved.

Furthermore, the user using the web service with MFP 1 can know whether the linked function is allowed to be used or not when the user selects the use of the web service. Therefore, since the user can select whether to use the web service or not at that point, for example, the system becomes more user-friendly.

[Variation 1]

Figure 11:
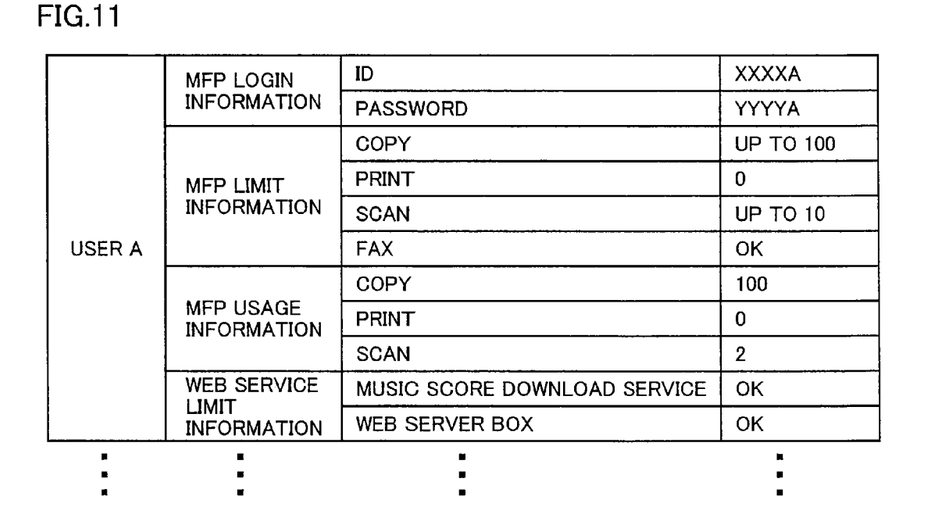
FIG. 11 shows a variation of the user management information.

Not only the availability of each function of MFP 1 as shown in FIG. 4 but also the limit of the use is registered in some cases as shown in FIG. 11, as information for limiting the use of MFP 1 when the specific user such as the manager of the printing system registers the user who can use MFP 1 in MFP 1 and generates/updates the user management information. More specifically, with reference to FIG. 11, the upper limit of the number of copies, the upper limit of the number of prints, the upper limit of the number of scans and the like are set for each user (user A) registered as a user allowed to use MFP 1. In this case, when the upper limit is set to zero, it means that the function is not allowed to be used. In addition, in this case, CPU 11 counts the usage state of each function to each user by a counting function and stores the information in memory unit 13. Although it is assumed that the usage state of MFP 1 to each user is stored as the user management information in this embodiment shown in FIG. 11, since this information is automatically stored by the counter function, it may be stored separately from the user management information.

In addition, although the upper limit of the number is set for each function in the specific example shown in FIG. 11, the "limit of the use of the function" is not limited to the setting of the upper limit. For example, availability of the detailed kind of each function may be set. More specifically, the resolution may be set to permit the usage. In addition, it may be set such that the use is permitted in black and white but the use is not permitted in other colors. Furthermore, in the facsimile function, its communication counterpart may be designated, the area code of the communication counterpart may be designated or the communication may be limited to the domestic communication. Although it is assumed that the upper limit number is set as the limit of the use of the function in the following specific example, the same is true in the above other limits.

Figure 12:
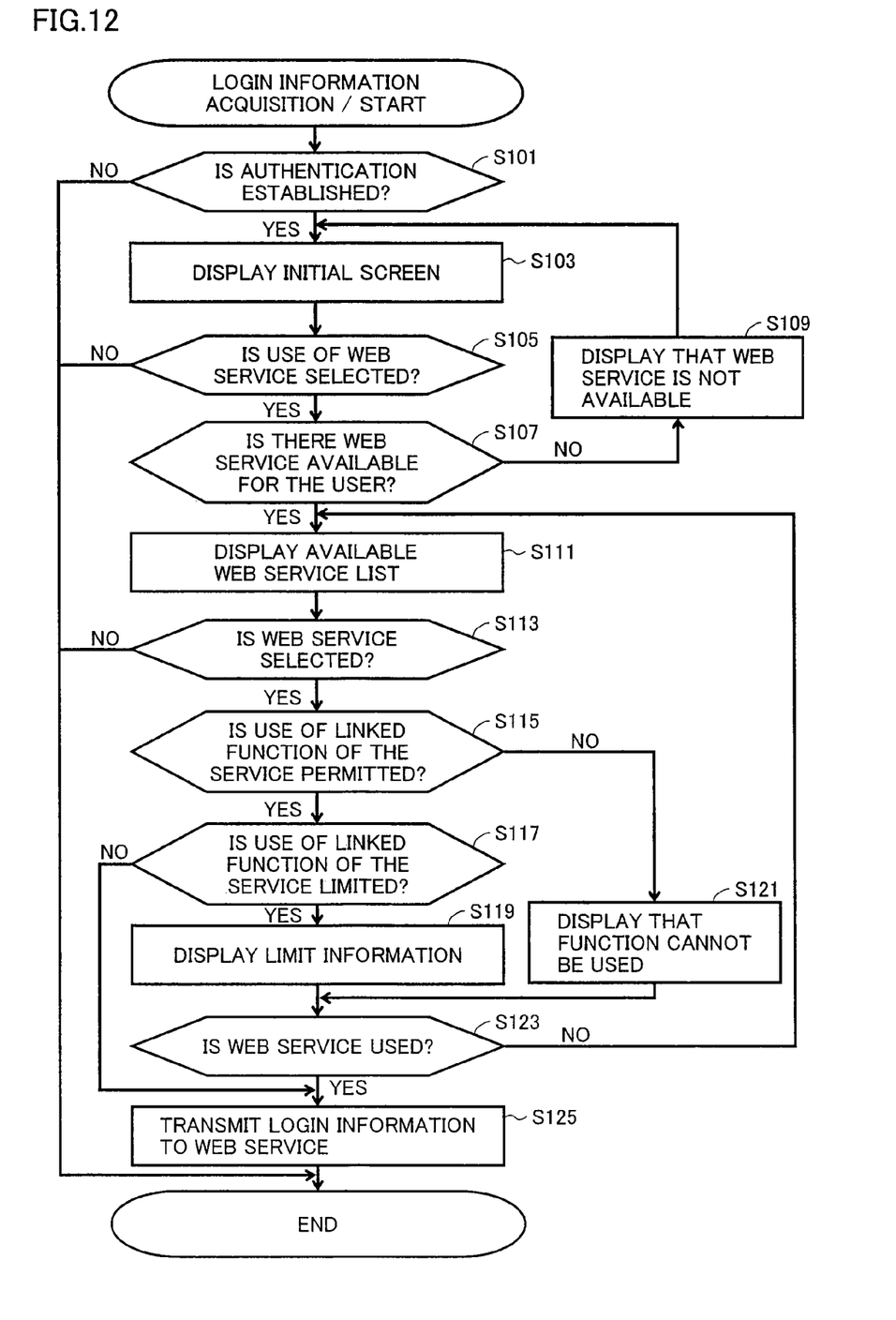
FIG. 12 is a flowchart showing a variation of the processing flow carried out in the MFP.

When the limit of the use of the function is set for the user, the processes as shown in FIG. 12 are performed in MFP 1.

With reference to FIG. 12, steps S101 to S115 are similar processes as those shown in FIG. 6. When it is determined that the function can be used by the user authenticated in step S101 in function determining unit 113 with reference to the user management information in step S115 (YES in step S115), it is determined whether the use of the function is limited or not (in step S117). As a result, when it is determined that the use of the linked function with the web service selected in step S113 is limited (YES in step S119), a screen to the effect that is displayed on operation panel 17 according to the control signal from screen display unit 104 (in step S119). For example, when the use of the printing function is limited as shown in FIG. 11 in the linked functions of MFP 1 with the web service selected in step S113, and the printing number has already reached the upper limit, a screen to the effect that the printing cannot be performed any more as shown in FIG. 10 is displayed in step S119. Alternatively, when a use of the scanning function is limited as shown in FIG. 11, and another eight scanning can be performed, a screen to the effect that such as a screen showing "Only eight more scanning is available. Will you still continue?" may be displayed. In addition, even when the limit of the use of the function is the other setting such as the color as described above, it is preferable that a screen displaying the information showing the limit such as a screen "Color printing cannot be performed. Will you continue?" is displayed similarly.

As described above, since the web service is used even in such condition, it is preferable that a screen showing that the use of the linked function of MFP 1 with the web service selected in step S113 is limited and an option whether the web service is used or not under such condition is displayed in step S119.

After that, similar processes as in FIG. 6 are performed.

When the setting is completed in MFP 1 as described above, since the usage of the web service by the user with MFP 1 can be limited in detail so as to correspond to the limit of a use of each function in MFP 1, more detailed unified management can be implemented.

In addition, the user using the web service with MFP 1 can know that the use of the linked function is limited (only the predetermined number is to be outputted) when the use of the web service is selected. Therefore, since the user can select whether to use the web service at that point, the device becomes more user-friendly.

In addition, although the fact that the use of the linked function of MFP 1 with the web service is limited is shown at a timing before the login to the web service in the above example, instead of the above timing or in addition to the above timing, it may be shown after the login to the web service. In addition, it may be such that the detail of the linked function of MFP 1 such as whether information of the number of printing is provided or whether information for color printing is provided is acquired and that information is compared with the set limit of the function and the compared result is shown after the login to the web service. In this constitution, the device can be more user-friendly.

[Variation 2]

Figure 13:
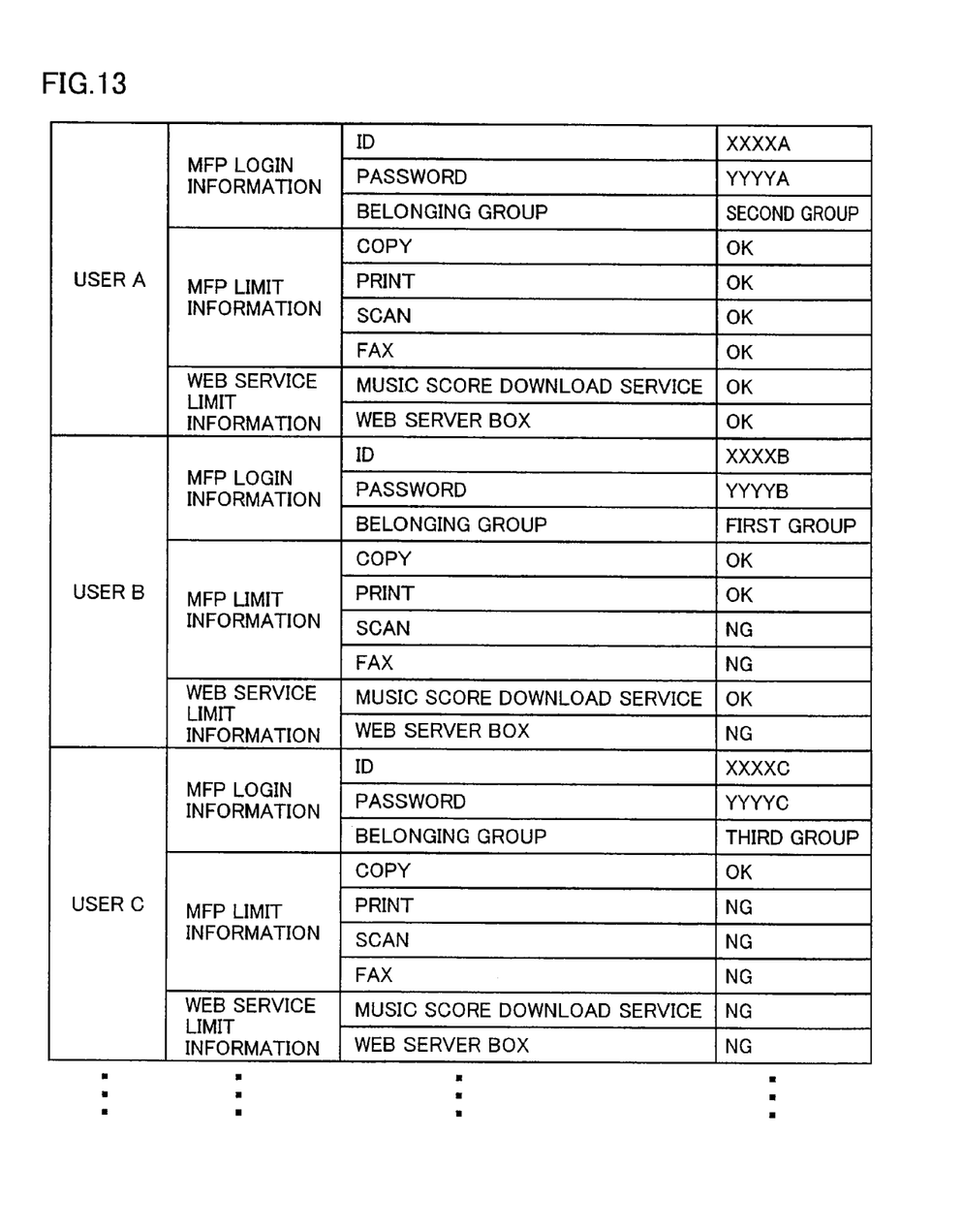
FIG. 13 shows a variation of the user management information.

When the MFP is used in an office environment especially, the user is registered in the MFP by the previously set group the user belongs to such as the section or the department, for charging management, for example. More specifically, as shown in FIG. 13, the specific user such as the manager of the printing system registers the user who can use MFP 1 and registers the information designating the previously set group for each user as the MFP login information of each user when the user management information is created/updated in some cases.

Figure 14:
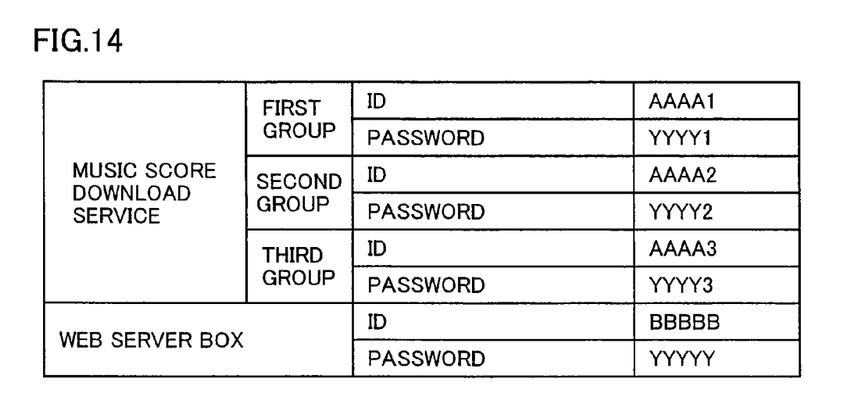
FIG. 14 shows a variation of the service management information.

In this case, as shown in FIG. 14, the service login information for logging in each web service is set by the group in the service management information stored in management information memory unit 105. The service management information in this case is stored such that when the specific user such as the manager of the printing system registers and/or changes the service management information, the specific user performs an operation for acquiring the information for logging in the web service (service log information) through a contract with the provider (providing company and the like) of the web service with respect to each group.

When the service login information is set with respect to each group, MFP 1 acquires the service login information set for each group the user authenticated in step S101 belongs to, from the service management information as shown in FIG. 14 in step S125 for login.

Thus, when the service login information is set with respect to each group, a charging management regarding the use of the web service can be performed with respect to each the group.

In addition, although the information for limiting the function of the MFP and the information for limiting the web service are set with respect to each user in the example shown in FIG. 13 similar to the example shown in FIG. 4, the information may be limited with respect to each group.

[Variation 3]

Figure 15:
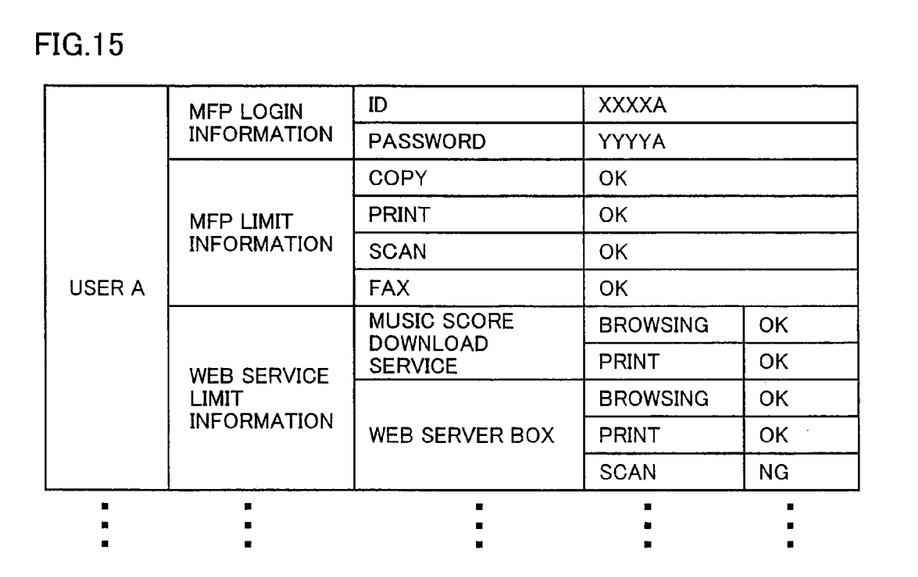
FIG. 15 shows a variation of the user management information.

In addition, as the user management information, as shown in FIG. 15, it may be set whether the linked function of the available web service can be used or not for each user separately from the information for limiting the use of MFP 1. This setting can be also registered or changed by the specific user such as the manager of the printing system. In addition, like the variation 1, the limit of the usage of the linked function with the available web service (upper limit number, for example) may be set for each user.

In this case, MFP 1 determines whether the function can be used or not in step S115 with reference to the setting of the availability of each linked function with the web service for the web service selected in step S113. The same is true in step S117.

By setting in MFP 1 as described above, the usage when the web service is used with MFP 1 by the user can be limited by MFP 1 more in detail, whereby more detailed unified management can be implemented.

[Variation 4]

Figure 16:
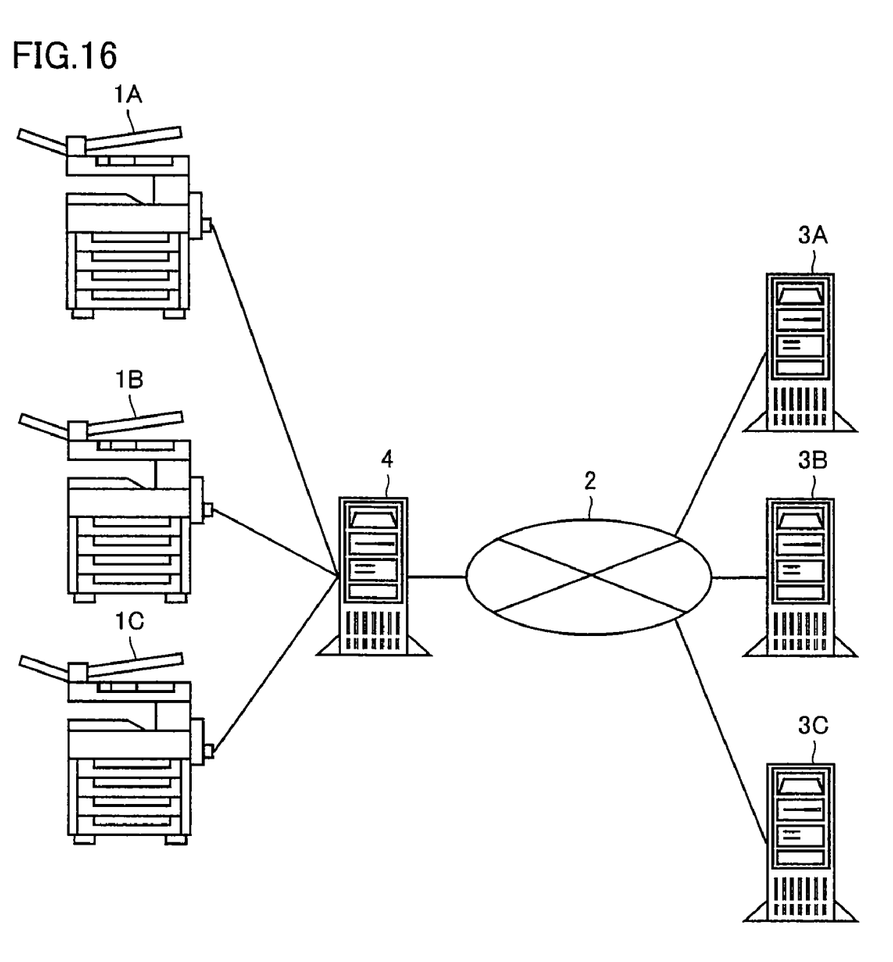
FIG. 16 shows a variation of the constitution of the printing system.

The printing system may be constituted such that as shown in FIG. 16, it includes a management server 4 as an information management device and management server 4 manages a plurality of MFP 1A to MFP 1C (represented by MFP1). Management server 4 can be a general personal computer and the like.

Although management information memory unit 105 is provided in MFP 1 in memory unit 13 of MFP 1, for example in the above example, management server 4 may store management information memory unit 105 as a fourth variation. In this case, authentication processing unit 103, service determining unit 109, function determining unit 113 and service authentication information acquiring unit 115 in MFP 1 access the above memory device and refer to the management information or acquire necessary information according to need.

Furthermore, as the fourth variation, management server 4 may be provided with at least one of authentication processing unit 103, service determining unit 109, function determining unit 113 and service authentication information acquiring unit 115 of MFP 1. Alternatively, it may be provided with all of those. In this case, MFP 1 outputs a necessary signal to management server 4 and acquires a determined result or information from the function in management server 4 to continue the process. In addition, it may be constituted such that several processes in the above processes are executed by management server 4 and MFP 1 receives the processed result from management server 4. The present invention includes any constitution of the above.

In addition, there can be provided a program to execute the above processes when a computer functions as MFP 1 or management server 4. Such program can be provided as a program product when the program is stored in a computer-readable recording medium such as a flexible disk, a CD-ROM (Compact Disk-Read Only memory), an ROM (Read Only Memory), an RAM (Random Access Memory), or a memory card attached to the computer. Alternatively, the program may be recorded in a recording medium such as a hard disk mounted on the computer. Further alternatively, the program may be provided by downloading through the network.

In addition, the program according to the present invention may be executed by calling a necessary module at a predetermined arrangement and at a predetermined timing, from program modules provided as a part of an operation system (OS) of the computer. In this case, since the program itself does not contain the module, the process is executed together with the OS. The program not containing the module can be contained in the program according to the present invention.

Furthermore, the program according to the present invention may be provided such that it is incorporated in another program. In this case also, since the program itself does not contain a module contained in the other program, the process is executed together with the other program. The program incorporated in the other program can be also contained in the program according to the present invention.

The provided program product is installed in a program storage unit such as a hard disk to be executed. In addition, the program product includes a program itself, and a recording medium for recording the program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
 a first acquiring logic implemented on a hardware processor of the image forming apparatus, configured to acquire first authentication information related to a user, to use said image forming apparatus;
 a second acquiring logic configured to acquire an authenticated result of said user based on said first authentication information from an authenticating logic;
 a third acquiring logic configured to acquire second authentication information related to said image forming apparatus, to use a web service with said image forming apparatus, from a memory;
 a fourth acquiring logic configured to acquire function limit information for limiting a use of the function of said image forming apparatus with respect to said user from said memory logic;
 a fifth acquiring logic configured to acquire information about a linked function of said image forming apparatus with said web service from said memory logic;
 an accessing logic configured to access said web service with said second authentication information when said authenticated result establishes the authentication of said user and said user can use said linked function of said image forming apparatus with said web service; and
 a designating logic configured to designate a use of said web service when said web service is used by using a function other than the functions for which said use is limited even when the use of the linked function of said image forming apparatus with said web service is limited for said user,
 wherein said accessing logic accesses said web service when said designating logic designates the use of said web service in a case where the use of said linked function of said image forming apparatus with said web service is limited for said user.

2. The image forming apparatus according to claim 1, further comprising a sixth acquiring logic configured to acquire service use limit information for limiting the use of said web service from a memory logic, wherein said accessing logic accesses said web service when the use of said web service is allowed for said user.

3. The image forming apparatus according to claim 2, wherein said service use limit information limits the use of said web service with respect to said user.

4. The image forming apparatus according to claim 2, wherein said service use limit information limits a use of said linked function of said image forming apparatus with said web service with respect to said user.

5. The image forming apparatus according to claim 1, wherein
said first authentication information includes information for specifying a group said user belongs to, and
said second authentication information is further related to said group.

6. A non-transitory computer readable medium storing a program allowing a computer to function as an image forming apparatus, said program causing said computer to perform the steps of:
receiving an input of first authentication information related to a user, to use said image forming apparatus;
acquiring an authenticated result of said user based on said first authentication information from an authenticating function;
acquiring second authentication information related to said image forming apparatus, to use a web service with said image forming apparatus, from a memory unit;
acquiring function limit information for limiting a use of the function of said image forming apparatus with respect to said user from a memory unit;
acquiring information about a linked function of said image forming apparatus with said web service from a memory unit;
accessing said web service with said second authentication information when said authenticated result establishes the authentication of said user and said user can use the linked function of said image forming apparatus with said web service; and
designating a use of said web service when said web service is used by using a function other than the functions for which said use is limited even when the use of the linked function of said image forming apparatus with said web service is limited for said user, wherein
in said accessing step said web service is accessed when in said designating step the use of said web service is designated in a case where the use of said linked function of said image forming apparatus with said web service is limited for said user.

7. A method for using a web service with an image forming apparatus comprising the steps of:
receiving an input of first authentication information related to a user, to use said image forming apparatus;
acquiring an authenticated result of said user based on said first authentication information from an authenticating function;
acquiring second authentication information related to said image forming apparatus, to use a web service with said image forming apparatus, from a memory unit;
acquiring function limit information for limiting a use of the function of said image forming apparatus with respect to said user from said memory unit;
acquiring information about a linked function of said image forming apparatus with said web service from said memory unit;
accessing said web service with said second authentication information when said authenticated result establishes the authentication of said user and said user can use said linked function of said image forming apparatus with said web service; and
designating a use of said web service when said web service is used by using a function other than the functions for which said use is limited even when the use of the linked function of said image forming apparatus with said web service is limited for said user, wherein
in said accessing step said web service is accessed when in said designating step the use of said web service is designated in a case where the use of said linked function of said image forming apparatus with said web service is limited for said user.

8. An image forming system comprising:
an image forming apparatus and an information management device, said information management device including:
a first memory for storing apparatus authentication information as authentication information related to said image forming apparatus, to use a web service with said image forming apparatus;
a second memory for storing function limit information for limiting a use of the function of said image forming apparatus for each user; and
a third memory for storing information about a linked function of said image forming apparatus with said web service, and
said image forming apparatus including
a first acquiring logic for acquiring user authentication information related to a user, to use said image forming apparatus;
a second acquiring logic for acquiring an authenticated result of said user based on said user authentication information from an authenticating unit logic;
a third acquiring logic for acquiring said apparatus authentication information about the image forming apparatus from said information management device;
a fourth acquiring logic for acquiring said function limit information about said user from said information management device;
a fifth acquiring logic for acquiring information about a linked function of said image forming apparatus with said web service from said information management device;
an accessing logic for accessing said web service with said apparatus authentication information when said authenticated result establishes the authentication of said user and said user can use the linked function of said image forming apparatus with said web service; and
a designating logic designating a use of said web service when said web service is used by using a function other than the functions for which said use is limited even when the use of the linked function of said image forming apparatus with said web service is limited for said user, wherein
said accessing logic accesses said web service when said designating logic designates the use of said web service in a case where the use of said linked function of said image forming apparatus with said web service is limited for said user.

* * * * *